US009590424B2

(12) United States Patent
Grisenti et al.

(10) Patent No.: US 9,590,424 B2
(45) Date of Patent: Mar. 7, 2017

(54) DEVICE FOR INFLUENCING REACTIVE-POWER FLOWS

(71) Applicant: Coil Holding GmbH, Eferding (AT)

(72) Inventors: Alexander Grisenti, Gunskirchen (AT); Johann Muelleder, Vienna (AT); Peter Dopplmair, Fraham (AT)

(73) Assignee: Coil Holding GmbH, Eferding (AT)

( * ) Notice: Subject to any disclaimer, the term of this patent is extended or adjusted under 35 U.S.C. 154(b) by 231 days.

(21) Appl. No.: 14/370,560

(22) PCT Filed: Jan. 4, 2013

(86) PCT No.: PCT/AT2013/050002
§ 371 (c)(1),
(2) Date: Aug. 14, 2014

(87) PCT Pub. No.: WO2013/102231
PCT Pub. Date: Jul. 11, 2013

(65) Prior Publication Data
US 2015/0028822 A1    Jan. 29, 2015

(30) Foreign Application Priority Data

Jan. 4, 2012  (AT) .................................. A 9/2012

(51) Int. Cl.
*H02J 3/18*  (2006.01)
*H02J 3/26*  (2006.01)

(52) U.S. Cl.
CPC ............. *H02J 3/1821* (2013.01); *H02J 3/18* (2013.01); *H02J 3/1807* (2013.01); *H02J 3/26* (2013.01); *Y02E 40/30* (2013.01); *Y02E 40/50* (2013.01)

(58) Field of Classification Search
CPC ........ Y02E 40/12; Y02E 40/30; H02J 3/1864; H02J 3/16; H02J 3/06; H02J 3/1828; H02J 3/1878
See application file for complete search history.

(56) References Cited

U.S. PATENT DOCUMENTS 3,936,727 A * 2/1976 Kelley, Jr. ............ G01R 15/142
                                                    323/210
3,963,978 A * 6/1976 Kelley, Jr. ............. H02J 3/1864
                                                    323/210

(Continued)

FOREIGN PATENT DOCUMENTS

KR    20110001747 A    1/2011
WO    2008141963 A2    11/2008

OTHER PUBLICATIONS

International Search Report of PCT/AT2013/050002, mailed Jun. 24, 2014.

*Primary Examiner* — Adolf Berhane
*Assistant Examiner* — Henry Lee, III
(74) *Attorney, Agent, or Firm* — Collard & Roe, P.C.

(57) ABSTRACT

The invention relates to a device for influencing reactive power flows in multi-phase alternating current systems comprising a plurality of thyristor-controlled or thyristor-switched coil branches, each of which comprises a first partial coil and a second partial coil, and a first partial coil and a second partial coil respectively form a structurally independent coil subassembly. The essential feature is that the inductance factor of the first partial coil is specifically dimensioned so as to be at least 10% greater than the inductance factor of the second partial coil and the second partial coil in a coil subassembly is disposed structurally above the first partial coil or the second partial coil is disposed structurally in a core region of the first partial coil. The disclosed device for influencing reactive power flows (Continued)

has a design that is as compact as possible, meets increased stability requirements especially for dynamic loads, and allows production costs and operating expenses to be reduced or kept to a minimum.

15 Claims, 7 Drawing Sheets

(56) References Cited

U.S. PATENT DOCUMENTS

| | | | | |
|---|---|---|---|---|
| 3,992,661 | A | * | 11/1976 | Kelley, Jr. .............. H02J 3/1864 323/210 |
| 4,513,240 | A | * | 4/1985 | Putman ................... F01D 25/04 323/210 |
| 5,672,956 | A | * | 9/1997 | Fukui .................... H02J 3/1864 323/209 |
| 8,400,119 | B2 | | 3/2013 | Angquist et al. |
| 8,519,679 | B2 | | 8/2013 | Angquist et al. |
| 2003/0076075 | A1 | | 4/2003 | Ma et al. |
| 2008/0001581 | A1 | | 1/2008 | Takeda et al. |

\* cited by examiner

DEVICE FOR INFLUENCING REACTIVE-POWER FLOWS

CROSS REFERENCE TO RELATED APPLICATIONS

This application is the National Stage of PCT/AT2013/050002 filed on Jan. 4, 2013, which claims priority under 35 U.S.C. §119 of Austrian Application No. A 9/2012 filed on Jan. 4, 2012, the disclosure of which is incorporated by reference. The international application under PCT article 21(2) was not published in English.

BACKGROUND OF THE INVENTION

1. Field of the Invention

The invention relates to a device for influencing reactive power flows in multi-phase alternating current and three-phase systems comprising a plurality of thyristor-controlled or thyristor-switched coil branches, in which a first coil branch is connected to a first phase and a second phase of the alternating current system and another coil branch is connected to the first phase and another phase of the alternating current system. Each coil branch comprises a first partial coil and a second partial coil, which partial coils are connected via two first network-end electrical terminals respectively to the corresponding phase of the alternating current system and via two second thyristor-end electrical terminals to a thyristor unit connected between the partial coils. Furthermore, a first partial coil and a second partial coil respectively form a structurally independent coil subassembly and the longitudinal mid-axes of each of the preferably hollow cylindrical partial coils in the coil subassembly are oriented essentially vertically with respect to a support plane, in particular the ground or a building floor.

2. Description of the Related Art

Devices for influencing reactive power flows in multi-phase, in particular three-phase, alternating current systems with a plurality of thyristor-controlled or thyristor-switched coil branches between the phases of the alternating current system are basically known and for example constitute an essential component of so-called static reactive power compensators (static var compensators, SVC) and other flexible alternating current transmission systems (FACTS).

Also known with such devices is an approach whereby the inductance of a coil branch is split uniformly between two partial coils or chokes and the thyristors are connected between these two partial coils in order to achieve improved short-circuit and earth-fault protection. In this connection, another known approach is to combine the two partial coils of a coil branch, which are of an identical design and hence more efficient to manufacture in particular, in a structurally independent coil subassembly and the partial coils are disposed one above the other, primarily for reasons pertaining to space, in which case isolator or support elements support the bottom partial coil on the bottom support plane or ground on the one hand and support the top partial coil in an isolated arrangement relative to the bottom partial coil on the other hand.

SUMMARY OF THE INVENTION

The main disadvantage of this layout of coil subassemblies of a device for influencing reactive power flows in multi-phase alternating current systems is its relatively low stability with regard to dynamic loads such as earthquakes, for example, or forces acting on it transversely to the longitudinal mid-axes of the partial coils. The stability is adversely affected in particular by the relatively large overall height of the partial coils disposed one above the other as well as by the isolator or support elements between the partial coils of a coil subassembly. Furthermore, other problems occur due to an increase in electrical losses and the amount of material needed for manufacturing purposes due to splitting the inductances of the coil branches between two partial coils which are not completely magnetically coupled in particular.

The underlying objective of this invention is to propose a device for influencing reactive power flows in multi-phase alternating current systems which is capable of meeting increased requirements in terms of stability, especially with respect to dynamic loads, whilst being based on a design that is as compact as possible, and which at the same time allows production costs and operating expenses to be reduced or kept to a minimum.

The objective of the invention is achieved by a device of the type outlined above in which the inductance factor of the first partial coil of a coil branch is specifically at least 10% greater than the inductance factor of the second partial coil of a coil branch and in which device the second partial coil in a coil subassembly is disposed structurally on top of the first partial coil and the second top partial coil is supported by the first bottom partial coil.

The objective of the invention is also independently achieved by a device of the type outlined above in which the inductance factor of the first partial coil of a coil branch is specifically at least 10% greater than the inductance factor of the second partial coil of a coil branch and in which device the second inner partial coil in a coil subassembly is disposed structurally in a core region of the first outer partial coil.

On this basis, a device for influencing reactive power flows in multi-phase alternating current systems is obtained, the coil subassemblies of which, comprising respectively a first and a second partial coil, has a lower center of gravity than coil subassemblies known from the prior art. This lower center of gravity increases the stability of the coil subassemblies, especially with respect to dynamic loads such as earthquakes, for example. Based on the first advantageous embodiment, the center of gravity of a coil subassembly is lowered relative to the bottom support plane due to a reduction in inductance and in particular due to a reduction in the weight and/or height of the second top partial coil made possible or easier as a result, and a corresponding increase in the inductance and in particular by a resultant increase in the weight of the first bottom partial coil.

Based on the second advantageous embodiment, the center of gravity of a coil subassembly is primarily lowered relative to the bottom support plane by disposing the second partial coil of the coil subassembly in the core region of the first partial coil. The overall height of a coil subassembly can be reduced by up to 50% as a result. Also based on such an embodiment, the isolators or support elements between the partial coils can be dispensed with, thereby further increasing stability, in particular with respect to loads during earthquakes and with respect to transverse forces acting on the partial coils. Furthermore, reducing the inductance, which in particular makes it possible or easier to make the external diameter of the second inner partial coil smaller, ensures that the partial coils inserted one inside the other can be assembled to the smallest possible design. Another particular advantage is that the much more compact design of a coil subassembly specifically reduces the amount of space occupied in the vertical direction, thereby enabling transport costs to be reduced, for example, and making it easier to incorporate sound insulating features such as fitting a housing around a coil subassembly, for example.

In principle, such a housing can be made to a considerably smaller and hence more lightweight and effective design because the size of the coil subassembly is reduced. Above all, however, the fact that the second partial coil is mutually nested with the first partial coil in the core region means that very effective use is made of housings for reducing noise, which can be fitted so that they lie on the potential of the first outer partial coil and hence very close to the outer partial coil. As a result, there is no problem when it comes to maintaining distances from the second partial coil for isolation purposes because the second partial coil lies in the core region of the outer first partial coil.

By the core region of a hollow cylindrical coil in this document is meant an inner region of the coil and adjoining regions extending out beyond each end face of the coil. The inner region of the coil is therefore bounded by the planes of a first end face and an oppositely lying second end face of the coil. A region extending out beyond this represents the cylindrical continuation of the inner region of the coil and its height or length is bounded by up to a third of the height or length of the cylindrical inner region of the coil. A very large part of the total magnetic flow of the coil occurs in this core region.

With such devices for influencing reactive power flows in multi-phase alternating current systems, the total value of the inductance of a coil branch and hence the sum of the inductances of the first and second partial coils is effectively fixed by the desired capacity to influence reactive power flows. The minimum inductance of the second partial coil for ensuring a sufficient short circuit protection, in particular for limiting the maximum short circuit current occurring in the event of damage or an abnormal occurrence, usually lies far below the half value of the total inductance of the two partial coils. It is therefore possible to opt for different dimensioning of the first and second partial coil in terms of their respective inductance in principle.

In principle, the inductance of a partial coil is varied by adapting the number of turns in a winding. In order to reduce the inductance, the number of turns is reduced, which means in particular that the weight of the partial coil is reduced, as are its dimensions (height, external diameter etc.). In order to increase the inductance, the number of turns is increased, specifically resulting in the opposite effects. If the total inductance of the first and second partial coils is kept constant, the following, very advantageous, effect has been found to occur. In the case of the higher rated partial coil, the increase in weight, dimensions, material usage for production purposes, etc., is less pronounced than the decrease in these properties for the correspondingly lower rated coil. Furthermore, this effect is all the more pronounced, the greater the difference in inductance is between the two partial coils. Consequently, if using partial coils of differing dimensions, a smaller or lower and more lightweight coil subassembly can be obtained in particular, even though the total inductance of the partial coils of the coil subassembly remains constant.

In addition to the design advantages described above, the fact that the the two partial coils are differently dimensioned in terms of their inductance also reduces electrical losses because the losses in the second, smaller partial coil are reduced more sharply compared with an embodiment with equally dimensioned inductance factors than the increase in the first partial coil made correspondingly larger.

At this stage, it should also be pointed out that the design advantages and reduced electrical losses described above can also be achieved if the second partial coil of smaller dimensions is disposed underneath the first partial coil of larger dimensions in a coil subassembly. In this case, however, there is no guarantee that sufficient stability can be obtained, in particular in earthquake situations, other than by a considerably more complicated design.

Advantageous features and improvements of the invention are defined in the dependent claims and in the description relating to the drawings.

If the partial coils are disposed one inside the other, it is of advantage if the second partial coil of a coil subassembly is disposed in the core region of the first partial coil in such a way that the planes of a top end face and a bottom end face of the second partial coil are not disposed outside an inner region of the first partial coil formed by the planes of a top end face and a bottom end face of the first partial coil. This results in a particularly compact and stable coil subassembly because the inner partial coil does not project out from the inner region of the outer partial coil.

It is also of advantage if a center cross-sectional plane of the first partial coil and a center cross-sectional plane of the second partial coil in a coil subassembly lie in one plane. This results in a coil subassembly in which the mechanical loads of the at least one retaining device, which is provided by particular preference, and the amount of noise created are reduced because the effect of the magnetic force between the partial coils of a coil subassembly, which varies on a periodic basis in particular, is reduced or minimized.

In the case of a device for influencing reactive power flows where the first partial coil in the first coil branch is connected via its first network-end electrical terminal to the first phase of the alternating current system and the second partial coil is connected via its first network-end electrical terminal to the second phase of the alternating current system and the first partial coil in the other coil branch is connected via its first network-end electrical terminal to the other phase of the alternating current system and the second partial coil is connected via its first network-end electrical terminal to the first phase of the alternating current system, it is of particular advantage if at least the first partial coil from the first coil branch and the second partial coil from the other coil branch constitute a coil subassembly and the two first electrical terminals of the first partial coil and second partial coil connected to the first phase of the alternating current system are grouped together and constitute a joint electrical phase terminal of the coil subassembly. This results in a more compact coil subassembly which reduces the number of cable connections in particular because such a coil subassembly now has only three instead of four terminals. Specifically, the two first electrical terminals of the two partial coils are grouped to form a joint phase terminal and it, together with the two second electrical terminals of the two partial coils for connecting the latter to a thyristor unit, makes up the three remaining terminal points of a coil subassembly.

It is also of advantage if, in a situation where the partial coils in a coil subassembly are disposed one inside the other, these partial coils originating from different coil branches, the second partial coil is wound in the opposite direction from the first partial coil. This results in an at least partial matching of the phase positions of the currents in the partial coils of a coil subassembly, thereby providing partial coils with higher inductance factors due to an improved magnetic coupling and fewer electrical losses due to reduced compensating currents. As a result of this feature, for example, in a three-phase current system, the phase shift of the currents in the partial coils of a coil subassembly is reduced from −120° to 60° or halved.

It is also of particular advantage if at least one retaining device is provided so as to mechanically hold and stabilize the partial coils of a coil subassembly and an electrical connection is established between the partial coils by the at least one retaining device so that the joint electrical phase terminal of the coil subassembly is provided by means of the at least one retaining device. At least one such retaining device is provided in principle as a means of retaining and stabilizing the partial coils of the coil subassembly. This enables a saving to be made on the material needed for production purposes and leads to a reduction in the dimensions of the coil subassembly if this at least one retaining device is used at the same time to act as the joint electrical phase terminal of the partial coils combined in the coil subassembly.

In this connection, it is also of particular advantage if, in a situation where the partial coils are disposed one above the other, the at least one retaining device is disposed between the first bottom partial coil and the second top partial coil of a coil subassembly and is in direct electrical contact with a top end face of the bottom partial coil and with a bottom end face of the top partial coil. This being the case, the joint electrical phase terminal of the coil subassembly is formed by the at least one retaining device and because the partial coils are disposed one above the other, the isolators or support elements between the partial coils can be dispensed with since such elements are not necessary. This enables a more compact design of the coil subassemblies to be obtained and in particular imparts greater stability with respect to dynamic loads such as earthquakes, for example. Based on such an embodiment, at least two other retaining devices which are preferably not connected to one another are preferably disposed on a bottom end face of the bottom partial coil and a top end face of the top partial coil so that a second electrical terminal is formed respectively for connecting the coil subassembly to a thyristor unit.

Based on such an embodiment with the partial coils disposed one above the other, it is also of particular advantage to provide noise reducing devices, in particular housing, which preferably lie on the potential of the respective partial coil and are fitted continuously along the external faces of the two partial coils because it is not necessary to provide an isolating space between the partial coils since the at least one retaining device electrically connects the mutually facing end faces of the two partial coils disposed one above the other and there is therefore no difference in potential prevailing in this region. Such continuously extending noise reducing devices are highly effective.

If the partial coils are disposed one inside the other, it is also very expedient to dispose the at least one retaining device underneath the first outer partial coil and the second inner partial coil of a coil subassembly and to place it in direct electrical contact with bottom end faces of the two partial coils. This being the case, the joint electrical phase terminal of the coil subassembly is formed by the at least one retaining device, resulting in a very compact coil subassembly with a particularly low center of gravity relative to the support plane. With such an embodiment, it is preferable to provide at least two other retaining devices which are not electrically connected to one another on top end faces of the two partial coils so that a second electrical terminal is provided respectively for connecting the coil subassembly to a thyristor unit.

If the partial coils are disposed one inside the other, it is also expedient to provide the at least one retaining device constituting the joint electrical phase terminal on a plurality of electrically isolating support elements so that the coil subassembly is disposed spaced apart from the bottom support plane and the electrically isolating support elements are disposed along a first path vertically underneath the first partial coil and along a second path vertically underneath the second partial coil, in particular at regular distances along the respective path. This results in an ideal support for and transmission of the weight of the two partial coils of a coil subassembly via the electrically isolating support elements to the bottom support plane and the at least one retaining device can be made slimmer or smaller and thus dimensioned so as to save on weight and material.

If the partial coils are disposed one inside the other, it is also of advantage if the at least one retaining device constituting the joint electrical phase terminal has an outer portion for retaining the first partial coil and an inner portion for retaining the second partial coil of the coil subassembly and if the outer portion and inner portion of the retaining device are connected to one another via one or more uncoupling elements. This at least reduces the transmission of noise between the partial coils of the coil subassembly, in particular from the inner partial coil to the outer partial coil, which means that fewer and therefore more lightweight sound reducing devices are necessary and simpler and hence less expensive sound reducing devices can be used. Furthermore, as a result of the uncoupling elements, mechanical stress in the at least one retaining device due to thermal expansion is negligible and thus prevents mechanical damage to a coil subassembly.

In the case of a device for influencing reactive power flows in which the alternating current system comprises three phases and the device comprises three coil branches, it is of advantage if the first partial coil of the first coil branch and the second partial coil of a third coil branch are connected to the first phase and form a first coil subassembly, and the first partial coil of a second coil branch and the second partial coil of the first coil branch are connected to the second phase and form a second coil subassembly, and the first partial coil of the third coil branch and the second partial coil of the second coil branch are connected to a third phase and form a third coil subassembly. This results in a particularly compact and stable TCR arrangement for a three-phase alternating current system which, in addition to being subject to fewer electrical losses during operation, also incurs fewer costs for manufacturing purposes.

It is also of advantage if the first partial coil of a coil subassembly comprises several hollow cylindrical winding layers disposed concentrically with the longitudinal mid-axis of the first partial coil, and the several winding layers are electrically connected in parallel and magnetically coupled, and if the second partial coil of a coil subassembly comprises a single hollow cylindrical winding layer, and the second partial coil is likewise disposed concentrically with the longitudinal mid-axis of the first partial coil. This on the one hand increases the stability of a coil subassembly with respect to dynamic loads and loads acting transversely to the support plane because the center of gravity of a coil subassembly lies as far as possible in the middle or centrally on the bottom support plane in the vertical direction via the standing surface of the coil subassembly. In addition, due to the concentric disposition, magnetic forces between the partial coils are reduced, thereby reducing mechanical stress to the coil subassembly and the noise generated. On the other hand, electrical losses are reduced in a partial coil with several winding layers electrically connected in parallel because the ohmic resistance in such a partial coil is reduced.

It is particularly expedient if the inductance of the second partial coil amounts to 0.1% to 30%, in particular 0.3% to 20%, preferably 0.5% to 10% of the total inductance of the second partial coil and the corresponding first partial coil. These value ranges define the best possible inductance ratios for the two partial coils so that the second partial coil offers sufficient short circuit protection on the one hand and the lowest possible electrical losses occur in the second partial coil on the other hand.

It is of particular advantage if the value of the inductance factor of a second partial coil is selected so that, in the event of a short circuit, the maximum permissible value of the current loading for the thyristor unit is not exceeded across the second partial coil and this thyristor unit connected to it due to a short circuit current occurring as a result, in particular the short circuit current does not exceed a value of 25 kA. Such an upper limit for the maximum short circuit current which can occur reliably protects the thyristor unit from damage and failure on the one hand and reduces the maximum inductance factor of a second partial coil to the degree that this partial coil can be made to a relatively smaller and more lightweight design than the first partial coil and causes relatively few additional electrical losses on the other hand.

BRIEF DESCRIPTION OF THE DRAWINGS

To provide a clearer understanding, the invention will be described in more detail below with reference to the appended drawings.

These are highly simplified, schematic diagrams illustrating the following.

DETAILED DESCRIPTION OF PREFERRED EMBODIMENTS

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

Figure 1:
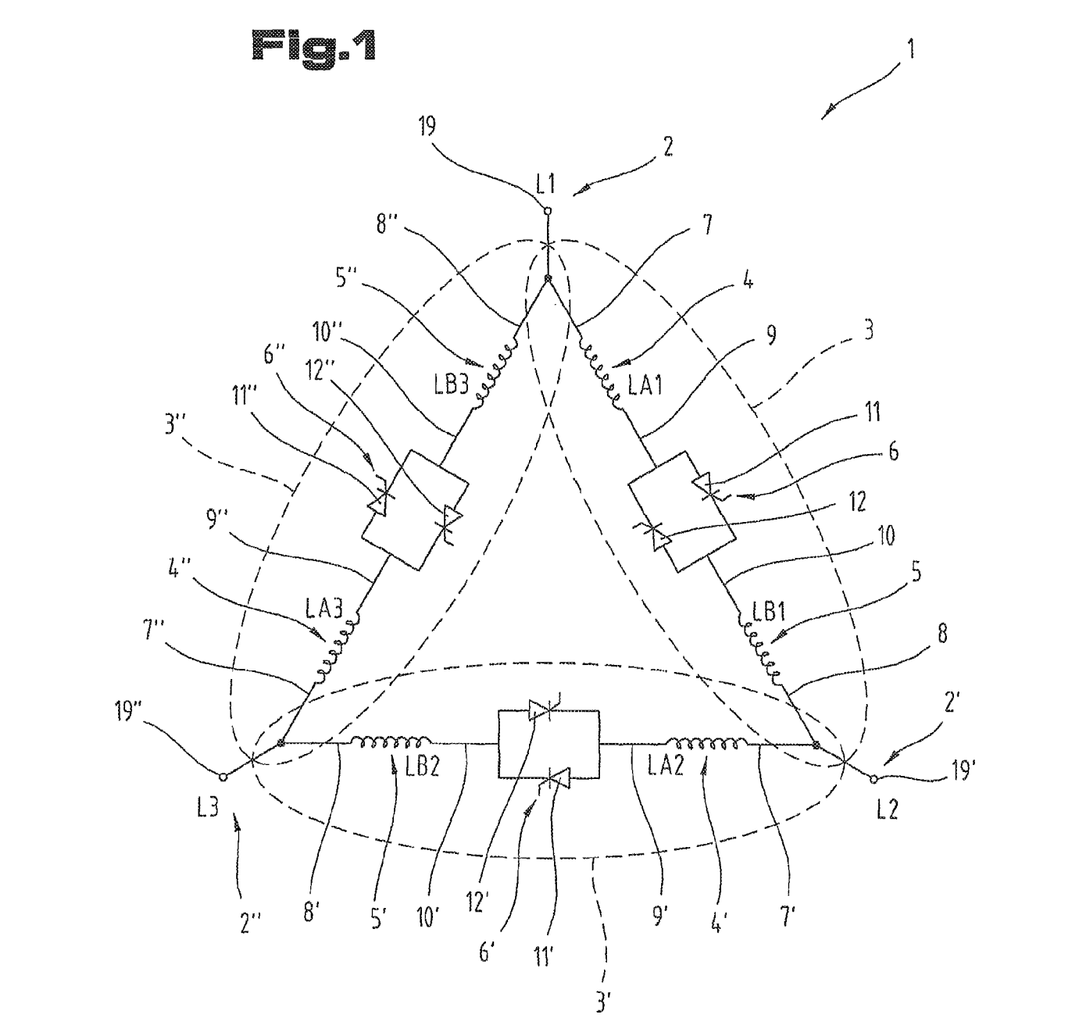
FIG. 1 is a circuit diagram of a device for compensating reactive power flows in multi-phase alternating current systems.

FIG. 1 shows a circuit diagram of a device 1 for influencing reactive power flows in a three-phase alternating current system, of a type known from the prior art. Such a device 1 is not restricted to a three-phase alternating current system but may also be designed in the same way for an alternating current system with multiple phases.

In this particular case, the multi-phase alternating current system has a first phase L1 2, a second phase L2 2' and a third phase L3 2". Disposed between the phases 2, 2', 2" of the alternating current system in a delta connection are a first coil branch 3, a second coil branch 3' and a third coil branch 3" of the device 1 for influencing reactive power flows.

The first coil branch 3 comprises a first partial coil LA1 4, a second partial coil LB1 5 and a thyristor unit 6 connected between the partial coils 4, 5. The two partial coils 4, 5 of the coil branch 3, which are preferably provided in the form of hollow cylindrical air coils, are connected via a first electrical terminal 7, 8 to the corresponding phase 2, 2' of the alternating current system. The partial coils 4, 5 are also each connected via a second electrical terminal 9, 10 to the thyristor unit 6 connected between the partial coils 4, 5. Such a thyristor unit 6 specifically comprises two thyristors 11, 12 connected in mirror image and generally at least one semiconductor element with control and/or switching functions for influencing the coil branch 3. In principle, the second coil branch 3' and the third coil branch 3" illustrated in FIG. 1 are of the same design as the first coil branch 3 and contain the same elements, in particular other first partial coils LA2 4' respectively LA3 4" and other second partial coils LB2 5' respectively LB3 5".

In principle, the idea of combining a first partial coil 4, 4', 4" and a second partial coil 5, 5', 5" to form a structurally independent coil subassembly 13, 13', 13" is known from the prior art. The two partial coils 4, 4', 4", 5, 5', 5" are of the same design and therefore have approximately the same inductance factors.

In this particular case, however, a first partial coil 4, 4', 4" and a second partial coil 5, 5', 5" of the coil branches 3, 3', 3" respectively the coil subassemblies 13, 13', 13" are differently dimensioned in terms of their inductance factors. In particular, a first partial coil 4, 4', 4" has an inductance that is at least 10% greater than a second partial coil 5, 5', 5". It has proved to be of particular practical advantage if the second partial coil 5, 5', 5" is dimensioned so that its inductance accounts for up to 0.1% to 30%, in particular 0.3% to 20%, preferably 0.5% to 10%, of the sum of the inductances of the second partial coil 5, 5', 5' corresponding first partial coil 4, 4', 4".

In principle, the level of the inductance factor of the second partial coil 5, 5', 5" is selected so that in the event of a short circuit, the maximum permissible value for the current loading of the thyristor unit 6, 6', 6" is not exceeded by a short circuit current flowing through the second partial coil 5, 5', 5" and a thyristor unit 6, 6', 6" connected to it, which means that the short circuit current does not exceed a value of 25 KA.

Figure 2:
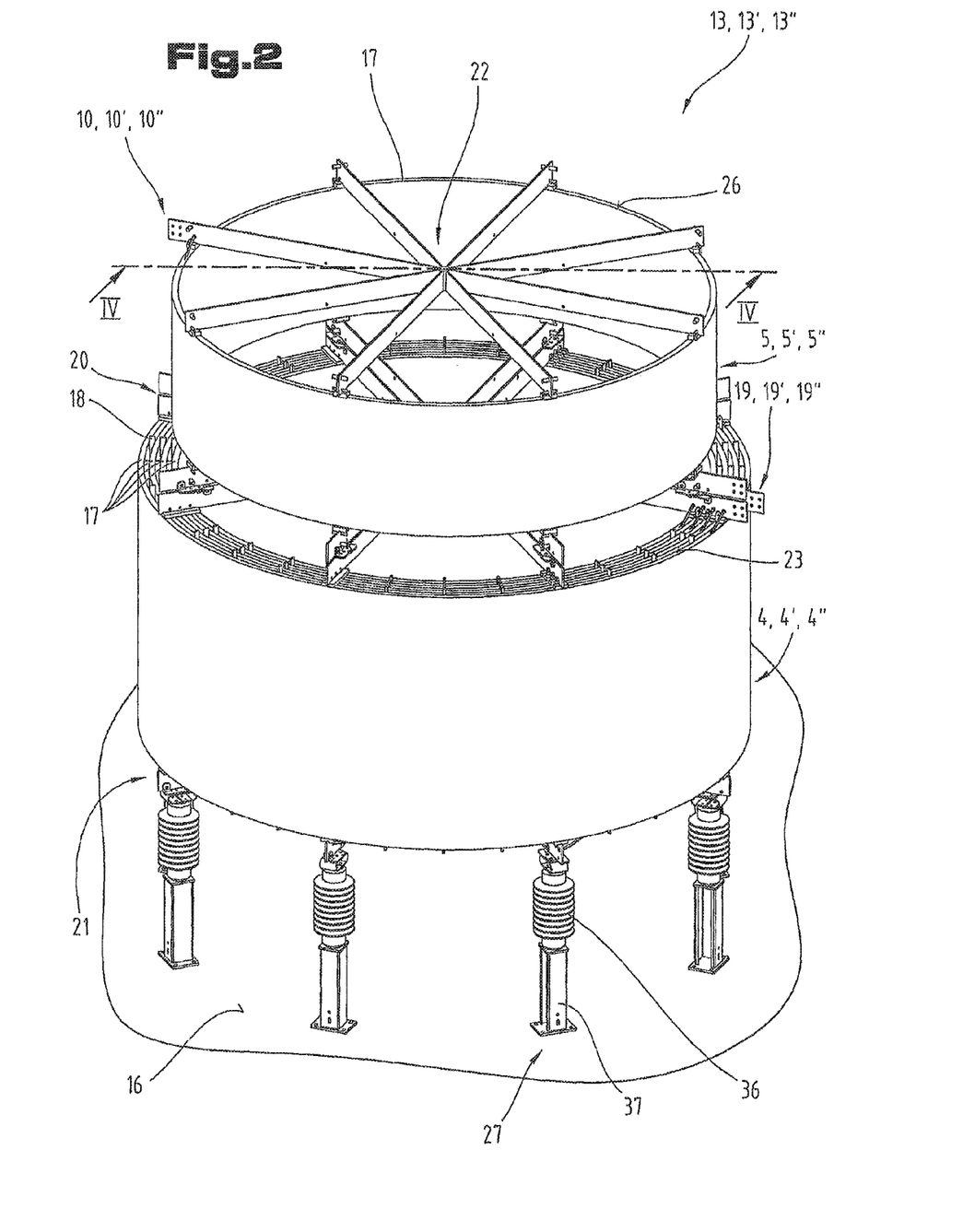
FIG. 2 is a first perspective view showing one variant of a coil subassembly for the device illustrated in FIG. 1 with partial coils disposed one above the other.
Figure 3:
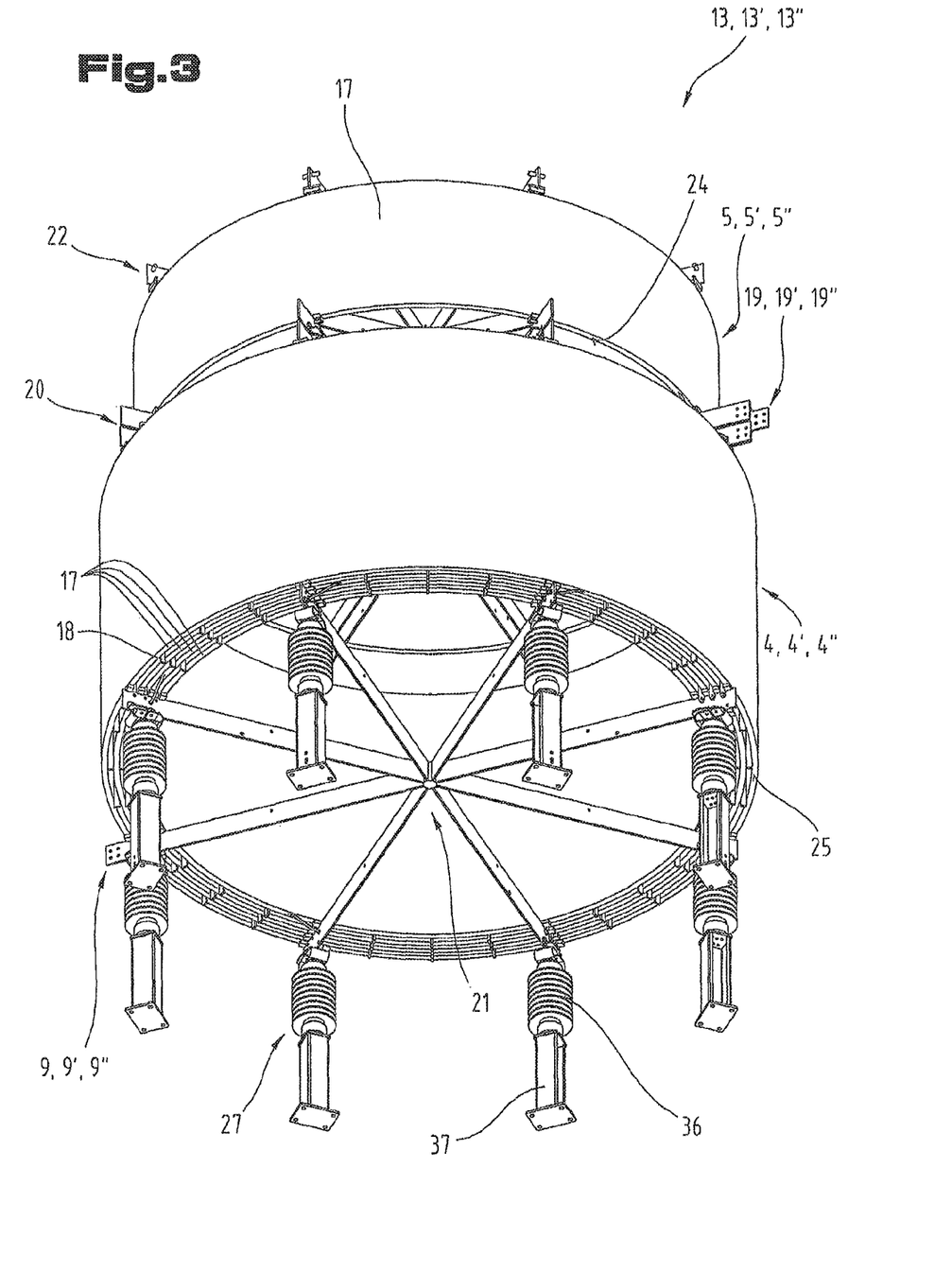
FIG. 3 is another perspective view of the coil subassembly illustrated in FIG. 2.
Figure 4:
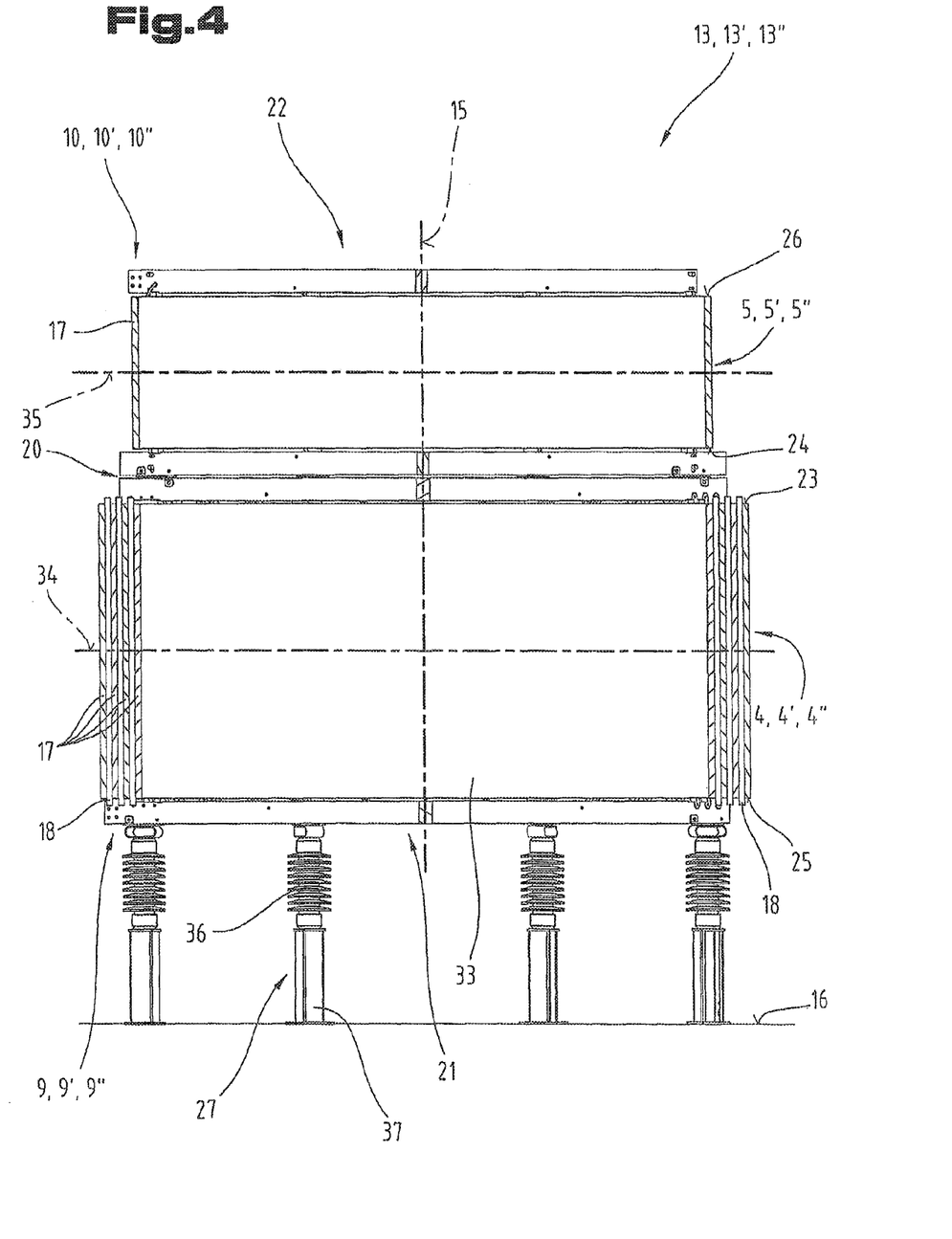
FIG. 4 is a diagram in section along section plane IV indicated in FIG. 2 showing the coil subassembly illustrated in FIG. 2.
Figure 5:
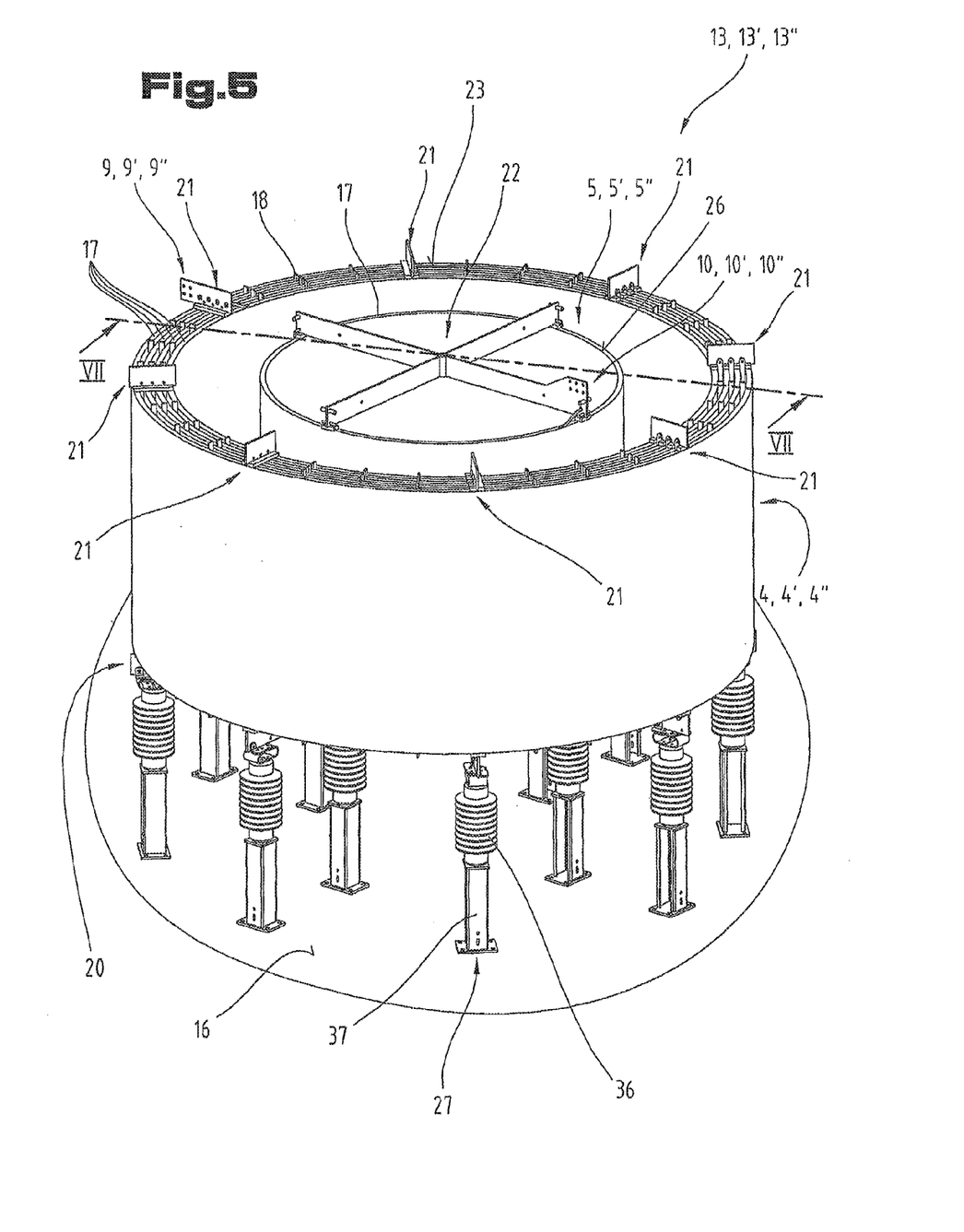
FIG. 5 is a first perspective view showing a coil subassembly for the device illustrated in FIG. 1 with partial coils disposed one inside the other.
Figure 6:
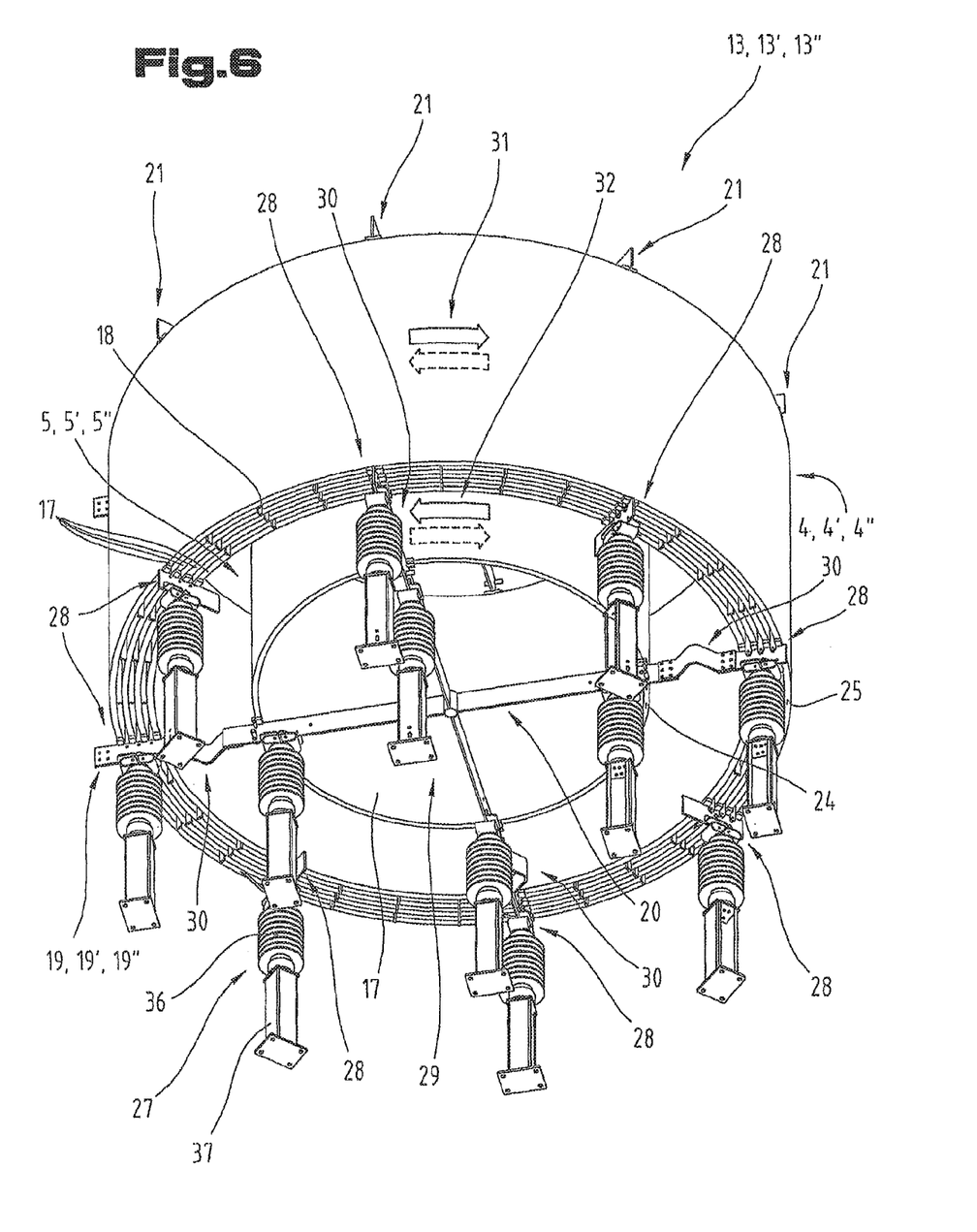
FIG. 6 is another perspective view showing the coil subassembly illustrated in FIG. 5.
Figure 7:
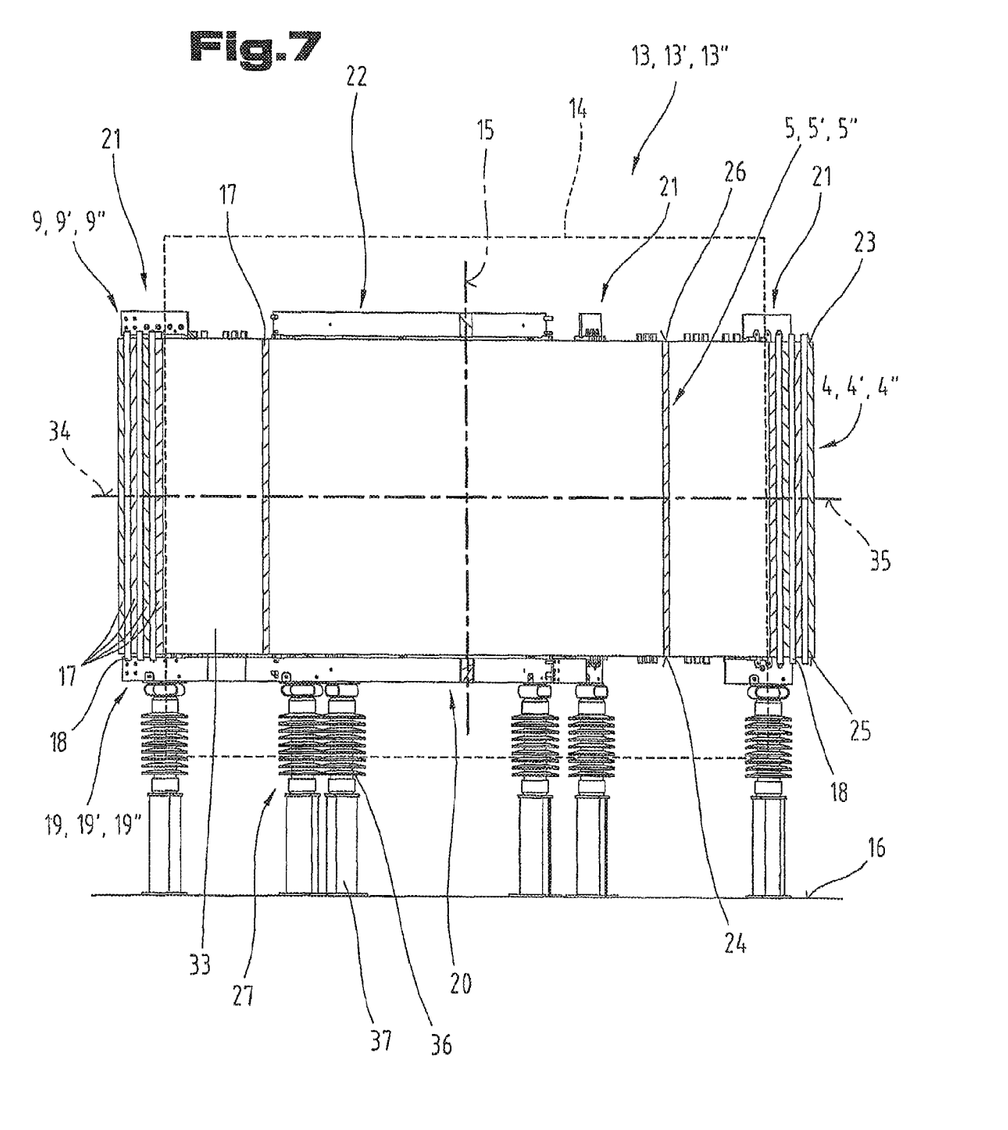
FIG. 7 is a diagram in section along section plane VII indicated in FIG. 5 showing the coil subassembly illustrated in FIG. 5.

FIGS. 2-4 illustrate different views of a first embodiment of a coil subassembly 13, 13', 13" in which the second, lower rated partial coil 5, 5', 5" is disposed structurally above the first partial coil 4, 4', 4" and the second partial coil 5, 5', 5" is supported by the first partial coil 4, 4', 4". FIGS. 5-7 show corresponding views of a second embodiment of a coil subassembly 13, 13', 13" in which the second, lower rated partial coil 5, 5', 5" is disposed structurally in a core region 14 of the first partial coil 4, 4', 4".

What all these coil subassemblies 13, 13', 13" have in common is that the longitudinal mid-axes 15 of the two partial coils 4, 4', 4", 5, 5', 5" in a coil subassembly 13, 13', 13" are oriented essentially vertically with respect to a support plane 16. The support plane 16 is effectively the ground or a building floor or building foundation.

In the embodiments illustrated as examples, the first bottom or outer partial coil 4, 4', 4" is made up of several hollow cylindrical winding layers 17 disposed concentrically with the longitudinal mid-axis 15 of the partial coils 4, 4', 4" and these winding layers 17 are electrically connected in parallel and magnetically coupled. The winding layers 17 are held at a distance apart by means of spacer bodies 18. The second top or inner partial coil 5, 5', 5" preferably comprises only a single winding layer 17, which is likewise disposed concentrically with the longitudinal mid-axis 15.

Based on a preferred embodiment, the first and second partial coils 4, 4', 4", 5, 5', 5" are respectively grouped to form structurally separate coil subassemblies 13, 13', 13" which are connected via their corresponding first electrical terminals 7, 7', 7", 8, 8', 8" to the same phase 2, 2', 2" of the alternating current system (see FIG. 1). In the three-phase alternating current system, therefore, the first partial coil 4 of the first coil branch 3 and the second partial coil 5" of the third coil branch 3" constitute the first coil subassembly 13 and their first electrical terminals 7, 8" connected to the first phase 2 of the alternating current system are connected to one another and form a joint electrical phase terminal 19 of the first coil subassembly 13. In the same manner, the first partial coil 4' of the second coil branch 3' and the second partial coil 5 of the first coil branch 3 constitute a second coil subassembly 13' and the first electrical terminals 7', 8 connected to the second phase 2' of the alternating current system are connected to one another to form a joint electrical phase terminal 19' of the second coil subassembly 13'. The first partial coil 4" of the third coil branch 3" and the second partial coil 5' of the second coil branch 3" likewise also constitute a third coil subassembly 13" and their first electrical terminals 7", 8' connected to the third phase 2" of the alternating current system are connected to one another to form a joint electrical phase terminal 19" of the third coil subassembly 13".

FIGS. 2-4 respectively 5-7 provide detailed illustrations of coil subassemblies 13, 13', 13" with first partial coils 4, 4', 4" and second partial coils 5, 5', 5" from different coil branches 3, 3', 3" based on different embodiments with a coil arrangement one above the other respectively a coil arrangement one inside the other. In principle, it would naturally also be possible to opt for corresponding coil subassemblies 13, 13', 13" with first partial coils 4, 4', 4" and second partial coils 5, 5', 5" from the same coil branches 3, 3', 3" and dispose the two respective partial coils 4, 4',4", 5, 5', 5" one above the other or one inside the other. This being the case, however, it is not possible to form a joint electrical phase terminal 19, 19', 19" in a coil subassembly 13, 13', 13". Furthermore, the two partial coils 4, 4', 4", 5, 5', 5" of such an alternative coil subassembly 13, 13', 13" would have to be electrically isolated from one another and disposed so that they are kept at minimum distances apart from one another.

In the case of the embodiments of a coil subassembly 13, 13', 13" illustrated in FIGS. 2-7, at least one retaining device 20 is provided as a means of mechanically retaining and stabilizing the partial coils 4, 4', 4", 5, 5', 5". An electrical connection is established between the partial coils 4, 4', 4", 5, 5', 5" of the respective coil subassembly 13, 13', 13" by means of this at least one retaining device 20, thereby simultaneously forming the corresponding joint phase terminal 19, 19', 19" of the respective coil subassembly 13, 13', 13". The at least one retaining device 20 of the coil subassembly 13, 13', 13" is preferably provided in the form of a winding star with several retaining arms extending radially with respect to the longitudinal mid-axis 15 of the partial coils 4, 4', 4", 5, 5', 5".

In the case of the embodiment of a coil subassembly 13, 13', 13" illustrated in FIGS. 2-4 where the partial coils 4, 4', 4", 5, 5', 5" are disposed one above the other, the at least one retaining device 20 is disposed between the first bottom partial coil 4, 4', 4" and the second top partial coil 5, 5', 5". The at least one retaining device 20 is electrically connected to a top end face 23 of the first partial coil 4, 4', 4" and to a bottom end face 24 of the second partial coil 5, 5', 5" and the joint electrical phase terminal 19, 19', 19" of the coil subassembly 13, 13', 13" is formed by the at least one retaining device 20. The at least one retaining device 20 itself is made up of two winding stars disposed one above the other and electrically connected. Based on this embodiment, two other retaining devices 21, 22 are also provided on a bottom end face 25 of the first partial coil 4, 4', 4" and a top end face 26 of the second partial coil 5, 5', 5" but are not electrically connected, and these retaining devices 21, 22 each form a second electrical terminal 9, 9', 9", 10, 10', 10" to connect a coil subassembly 13, 13', 13" to a thyristor unit 6, 6', 6".

As may be seen from FIGS. 2-4, a coil subassembly 13, 13', 13" sits on several electrically isolating support elements 27 which are disposed underneath the bottom retaining device 21 and the coil subassembly 13, 13', 13" and isolate or hold the bottom support plane 16 at a distance apart. An electrically isolating support element 27 comprises an isolation body 36 and a preferably section-type support body 37 disposed underneath.

In the embodiment illustrated in FIGS. 5-7 in which the partial coils 4, 4', 4", 5, 5', 5" are disposed one inside the other, the at least one retaining device 20 is disposed underneath the first partial coil 4, 4', 4" and the second partial coil 5, 5', 5" of a coil subassembly 13, 13', 13" and the bottom end faces 24, 25 of the two partial coils 4, 4', 4", 5, 5', 5" sit in a direct electrical contact with the at least one retaining device 20. This forms the joint electrical phase terminal 19, 19', 19" of the coil subassembly 13, 13', 13". Two other retaining devices 21, 22 which are not electrically connected to one another are disposed on the top end faces 23, 26 of the two partial coils 4, 4', 4", 5, 5', 5", and these retaining devices 21, 22 each constitute a second electrical terminal 9, 9', 9", 10, 10', 10" for connecting the coil subassembly 13, 13', 13" to a thyristor unit 6, 6', 6".

As may be seen from FIGS. 5-7, a retaining device 21 may also be made up of several individual retaining webs.

The retaining devices 20, 21 disposed on the respective end faces 23, 25 of the first partial coil 4, 4', 4" are designed so that they electrically connect the individual winding layers 17 of the first partial coil 4, 4', 4" in parallel.

In the case of a coil subassembly 13, 13', 13" with partial coils 4, 4', 4", 5, 5', 5" disposed one inside the other, it is of practical advantage to provide a plurality of electrically isolating support elements 27 underneath the at least one retaining device 20 which retain and support the two partial coils 4, 4', 4", 5, 5', 5". In the embodiment illustrated in FIGS. 5-7, the electrically isolating support elements 27 are mounted along a first circular path vertically underneath the first partial coil 4, 4', 4" and along a second circular path vertically underneath the second partial coil 5, 5', 5" at regular distances along the respective path. The first group of electrically isolating support elements 27 is therefore disposed directly underneath the first outer partial coil 4, 4', 4" of the coil subassembly 13, 13', 13" and the second group of electrically isolating support elements 27 is disposed directly underneath the second, inner partial coil 5, 5', 5" of the coil subassembly 13, 13', 13". All the electrically isolating support elements 27 together ensure that the coil subassembly 13, 13', 13" is spaced apart from and electrically isolated from the bottom support plane 16, which may be the ground or a building floor, for example.

As may best be seen from FIG. 6, the at least one retaining device 20 constituting the joint electrical phase terminal 19, 19', 19" of a coil subassembly 13, 13', 13" is divided into an outer portion 28 supporting the first outer partial coil 4, 4', 4" and an inner portion 29 supporting the second inner partial coil 5, 5', 5". In this particular case, the outer portion 28 of the retaining device 20 is made up of a plurality of individual retaining webs extending radially with respect to the longitudinal mid-axis 15 of the coil subassembly 13, 13', 13". At least some of the retaining webs of the outer portion 28 of the retaining device 20 are connected via uncoupling elements 30 to the inner portion 29 of the retaining device 20 and the inner portion 29 of the retaining device 20 is provided in the form of a winding star with a plurality of retaining arms extending radially with respect to the longitudinal mid-axis 15.

It is possible to use various embodiments for the uncoupling elements 30. On the one hand, these uncoupling elements might be provided in the form of stable angle elements, for example, which have a certain amount of elasticity in the radial direction. At the same time, these angle elements support some of the weight of the second, inner partial coil 5, 5', 5", which weight bears on the inner portion 29 of the retaining element 20 and the outer portion 28 of the retaining element 20, and the weight is directed via the electrically isolating support elements 27 of the outer portion 28 of the retaining element 20 to the support plane 16. This means that at least some of the electrically isolating support elements 27 of the inner portion 29 of the retaining device 20 can be dispensed with or such electrically isolating support elements 27 can even be dispensed with altogether in the region of the inner portions 29.

In order to obtain the best possible mechanical uncoupling of the outer portion 28 and inner portion 29 of the retaining device 20, in particular with a view to preventing the transmission of structure-borne sound and vibrations as well as mechanical tension in the retaining device 20, the uncoupling elements 30 may also be provided in the form of flexible stranded cables, for example. In this case, electrically isolating support elements 27 will also need to be provided in the region of the inner portion 29 of the retaining device 20 in order to take the weight of the second inner partial coil 5, 5', 5" and transmit it to the bottom support plane 16.

If the first partial coil 4, 4', 4" and second partial coil 5, 5', 5" are disposed one inside the other, it is of particular practical advantage to wind the second partial coil 5, 5', 5" in the opposite direction from the first partial coil 4, 4', 4". As indicated in FIG. 6, therefore, the first outer partial coil 4, 4', 4" is wound in a first winding direction 31 and the second inner 5, 5', 5" is wound in a second winding direction 32 opposite to it in this situation.

As may be seen from FIGS. 5-7, in the case of the illustrated embodiment of partial coils 4, 4', 4", 5, 5', 5" disposed one inside the other, the second inner partial coil 5, 5', 5" is disposed in the core region 14 of the first outer partial coil 4, 4', 4" in such a way that the planes of the second partial coil 5, 5', 5" fixed by the top end face 26 and bottom end face 24 are not disposed outside of an inner region 33 of the first partial coil 4, 4', 4". Accordingly, the inner region 33 is fixed by the planes of a top end face 23 and a bottom end face 25 of the first outer partial coil 4, 4', 4".

In the illustrated embodiment of partial coils 4, 4', 4", 5, 5', 5" disposed one inside the other, the two partial coils 4, 4', 4", 5, 5', 5" are specifically of the same axial height and their top end faces 23 respectively 26 and their bottom end faces 25 respectively 24 therefore lie in one plane. As already explained and as illustrated in FIG. 7, the core region 14 of a first partial coil 4, 4', 4" extends respectively by one third of the height or length of the inner region 33 of the first partial coil 4, 4', 4" at both end faces 23, 25 of the first partial coil 4, 4', 4" out beyond the inner region 33. The same also applies to an inner region or core region of the second partial coil 5, 5', 5", although this is not illustrated in the drawings.

As may also best be seen from FIG. 7, it is particularly expedient in the case of an embodiment based on partial coils 4, 4', 4", 5, 5', 5" disposed one inside the other if a center cross-sectional plane 34 of the first partial coil 4, 4', 4" in a coil subassembly 13, 13', 13" coincides with a center cross-sectional plane 35 of the second partial coil 5, 5', 5", thereby forming a common plane, and the first partial coil 4, 4', 4" and second partial coil 5, 5', 5" are centrally positioned with respect to one another in terms of their vertical orientations.

In the coil subassemblies 13, 13', 13" based on the embodiments illustrated as examples in FIGS. 2-7, particularly effective and at the same time lightweight and inexpensive noise-reducing features may be used. Noise-reducing devices such as housings or casings for a coil subassembly 13, 13', 13" (not illustrated in FIGS. 2-7) may be fitted very close to and, above all, continuously around the first bottom 4, 4', 4" and second top partial coil 5, 5', 5" respectively around the first outer partial coil 4, 4', 4" and hence also around the second, inner partial coil 5, 5', 5". Such a noise-reducing device is secured in particular to the retaining elements 20-22 and/or to the partial coils 4, 4', 4", 5, 5', 5" of a coil subassembly 13, 13', 13".

For the sake of good order, finally, it should be pointed out that, in order to provide a clearer understanding of the device for influencing reactive power flows, it and its constituent parts are illustrated to a certain extent out of scale and/or on an enlarged scale and/or on a reduced scale.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

The embodiments illustrated as examples represent possible variants of the device for influencing reactive power flows, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention. Furthermore, individual features or combinations of features taken from the embodiments described and illustrated as examples may be construed as inventive solutions or solutions proposed by the invention in their own right.

The objective underlying the independent inventive solutions may be found in the description.

Above all, the individual embodiments of the subject matter illustrated in FIGS. 1; 2-4; 5-7 constitute independent solutions proposed by the invention in their own right. The objectives and associated solutions proposed by the invention may be found in the detailed descriptions of these drawings.

| List of reference numbers | |
| --- | --- |
| 1 | Device |
| 2 | First phase |
| 2' | Second phase |
| 2" | Third phase |
| 3 | First coil branch |
| 3' | Second coil branch |
| 3" | Third coil branch |
| 4, 4', 4" | First partial coil |
| 5, 5', 5" | Second partial coil |
| 6, 6', 6" | Thyristor unit |
| 7, 7', 7" | First electrical terminal |
| 8, 8', 8" | First electrical terminal |
| 9, 9', 9" | Second electrical terminal |
| 10, 10', 10" | Second electrical terminal |
| 11, 11', 11" | Thyristor |
| 12, 12', 12" | Thyristor |
| 13, 13', 13" | Coil subassembly |
| 14 | Core region |
| 15 | Longitudinal mid-axis |
| 16 | Support plane |
| 17 | Winding layer |
| 18 | Spacer body |
| 19, 19', 19" | Joint electrical phase terminal |
| 20 | Retaining device |
| 21 | Retaining device |
| 22 | Retaining device |
| 23 | Top end face |
| 24 | Bottom end face |
| 25 | Bottom end face |
| 26 | Top end face |
| 27 | Support element |
| 28 | Outer portion |
| 29 | Inner portion |
| 30 | Uncoupling element |
| 31 | Winding direction |
| 32 | Winding direction |
| 33 | Inner region |
| 34 | Center cross-sectional plane |
| 35 | Center cross-sectional plane |
| 36 | Isolation body |
| 37 | Support body |

The invention claimed is:

1. A device for influencing reactive power flows in a multi-phase alternating current system comprising a plurality of thyristor-controlled or thyristor-switched coil branches, in which a first coil branch is connected to a first phase and a second phase of the multi-phase alternating current system and a second coil branch is connected to the first phase and a third phase of the multi-phase alternating current system, and each coil branch comprises a first partial coil and a second partial coil, wherein the first and second partial coils are connected via first electrical terminals respectively to the corresponding phase of the multi-phase alternating current system and via second electrical terminals to a thyristor unit connected between the first and second partial coils, and the first partial coil of the first coil branch and the second partial coil of the second coil branch form a structurally independent first coil subassembly, each of the first and second partial coils are constructed hollow-cylindrically and a longitudinal mid-axis of the first and second partial coils in the structurally independent first coil subassembly is respectively oriented vertically with respect to a support plane, wherein the first partial coil has an inductance factor specifically dimensioned so as to be at least 10% greater than an inductance factor of the second partial coil, and the second partial coil in the structurally independent first coil subassembly is disposed structurally above the first partial coil and the weight of the second partial coil is supported by the first partial coil.

2. A device for influencing reactive power flows in a multi-phase alternating current system comprising a plurality of thyristor-controlled or thyristor-switched coil branches, in which a first coil branch is connected to a first phase and a second phase of the multi-phase alternating current system and a second coil branch is connected to the first phase and a third phase of the multi-phase alternating current system, and each coil branch comprises a first partial coil and a second partial coil, wherein the first and second partial coils are connected via first electrical terminals respectively to the corresponding phase of the multi-phase alternating current system and via second electrical terminals to a thyristor unit connected between the first and second partial coils, and the first partial coil of the first coil branch and the second partial coil of the second coil branch form a structurally independent first coil subassembly, each of the first and second partial coils are constructed hollow-cylindrically and a longitudinal mid-axis of the first and second partial coils in the structurally independent first coil subassembly is respectively oriented vertically with respect to a support plane, wherein the first partial coil has an inductance factor specifically dimensioned so as to be at least 10% greater than an inductance factor of the second partial coil, and the second partial coil (5, 5") in the structurally independent first coil subassembly is disposed structurally in a core region of the first partial coil.

3. The device according to claim 2, wherein the second partial coil of the structurally independent first coil subassembly is disposed in the core region of the first partial coil in such a way that the planes of a top end face and a bottom end face of the second partial coil are not disposed outside of an inner region of the first partial coil formed by the planes of a top end face and a bottom end face of the first partial coil.

4. The device according to claim 2, wherein in the structurally independent first coil subassembly, a center cross-sectional plane (34) of the first partial coil and a center cross-sectional plane of the second partial coil lie in one plane.

5. The device according to claim 1, wherein the first partial coil in the first coil branch is connected via its first electrical terminal to the first phase of the multi-phase alternating current system and the second partial coil is connected via its first electrical terminal to the second phase of the multi-phase alternating current system and, in the ether second coil branch, the first partial coil is connected via its first electrical terminal to the third phase of the multi-phase alternating current system and the second partial coil is connected via its first electrical terminal to the first phase of the multi-phase alternating current system, and the first partial coil from the first coil branch and the second partial coil from the ether second coil branch constitute the structurally independent first coil subassembly and the first electrical terminals of the first partial coil and second partial coil connected to the first phase of the multi-phase alternating current system are grouped and constitute a joint electrical phase terminal of the structurally independent first coil subassembly.

6. The device according to claim 2, wherein in the structurally independent first coil subassembly, the second partial coil is wound in the direction opposite the first partial coil.

7. The device according to claim 5, wherein at least one retaining device is provided for mechanically retaining and stabilizing the partial coils of the structurally independent first coil subassembly and an electrical connection is established by the at least one retaining device between the partial coils so that the joint electrical phase terminal of the structurally independent first coil subassembly comprises the at least one retaining device.

8. The device according to claim 7, wherein the at least one retaining device is disposed between the first partial coil and the second partial coil of the structurally independent first coil subassembly and is in a direct electrical contact with a top end face of the first partial coil and with a bottom end face of the second partial coil thereby forming the joint electrical phase terminal of the structurally independent first coil subassembly, and at least two other retaining devices which are not in electrical contact with one another are provided at a bottom end face of the first partial coil and a top end face of the second partial coil thereby respectively forming the second electrical terminal to provide a connection to the thyristor unit.

9. The device according to claim 2, wherein at least one retaining device is disposed underneath the first partial coil and second partial coil of the structurally independent first coil subassembly and is in a direct electrical contact with bottom end faces of the two partial coils thereby forming the joint electrical phase terminal of the structurally independent first coil subassembly, and at least two other retaining devices which are not electrically connected to one another are provided at top end faces of the two partial coils thereby respectively forming the second electrical terminal to provide a connection to the thyristor unit (6, 6").

10. The device according to claim 9, wherein the at least one retaining device constituting the joint electrical phase terminal is disposed on a plurality of electrically isolating support elements so that the structurally independent first coil subassembly is disposed at a distance apart from the bottom support plane and the plurality of electrically isolating support elements are disposed along a first path vertically underneath the first partial coil and along a second path vertically underneath the second partial coil.

11. The device according to claim 9, wherein the at least one retaining device constituting the joint electrical phase terminal has an outer portion for retaining the first partial coil and an inner portion for retaining the second partial coil of the structurally independent first coil subassembly and the outer portion and inner portion of the retaining device are connected to one another via one or more uncoupling elements.

12. A device for influencing reactive power flows in a multi-phase alternating current system, wherein the multi-phase alternating current system comprises first, second, and third phases and the device comprises first, second, and third coil branches, and a first partial coil of the first coil branch and a second partial coil of the second coil branch are connected to the first phase and form a structurally independent first coil subassembly, and she a first partial coil of the third coil branch and a second partial coil of the first coil branch are connected to the second phase and form a structurally independent second coil subassembly, and a first partial coil of the second coil branch and a second partial coil of the third coil branch are connected to a third phase and form a structurally independent third coil subassembly, and wherein the level of the inductance factor of the second partial coil is selected so that, in the event of a short circuit resulting in a short circuit current across the second partial coil and the thyristor unit connected to the second partial coil, the maximum permissible value of a current for the thyristor unit is not exceeded by the short circuit current across the second partial coil and the thyristor unit connected to the second partial coil.

13. The device according to claim 1, wherein the first partial coil of the structurally independent first coil subassembly comprises a plurality of hollow cylindrical winding layers disposed concentrically with the longitudinal mid-axis of the first partial coil, and the plurality of winding layers is electrically connected in parallel and magnetically coupled, and the second partial coil of the structurally independent coil subassembly comprises a single hollow cylindrical winding layer, and the second partial coil is disposed concentrically with the longitudinal mid-axis of the first partial coil.

14. The device according to claim 1, wherein the second partial coil has an inductance amounting to 0.1% to 30% of the inductance of the second partial coil added to an inductance of the first partial coil.

15. The device according to claim 12, wherein the short circuit current does not exceed a value of 25 kA.

* * * * *

UNITED STATES PATENT AND TRADEMARK OFFICE
CERTIFICATE OF CORRECTION

PATENT NO. : 9,590,424 B2  
APPLICATION NO. : 14/370560  
DATED : March 7, 2017  
INVENTOR(S) : Grisenti et al.

Page 1 of 1

It is certified that error appears in the above-identified patent and that said Letters Patent is hereby corrected as shown below:

In the Claims

In Column 14, Line 58 (Line 7 of Claim 5) please delete the word: "ether".

In Column 14, Line 64 (Line 13 of Claim 5) please delete the word: "ether".

In Column 16, Line 16 (Line 8 of Claim 12) please delete the word: "she".

Signed and Sealed this  
Fourth Day of July, 2017

Joseph Matal  
*Performing the Functions and Duties of the*  
*Under Secretary of Commerce for Intellectual Property and*  
*Director of the United States Patent and Trademark Office*